Patented Mar. 19, 1946

2,396,989

UNITED STATES PATENT OFFICE 2,396,989

PROCESS FOR THE PREPARATION OF 1-BROMO-2-METHYLANTHRAQUINONE

Joseph Deinet and Hans B. Gottlieb, Glassboro, N. J., assignors to E. I. du Pont de Nemours & Company, Wilmington, Del., a corporation of Delaware No Drawing. Application March 20, 1945, Serial No. 583,860

1 Claim. (Cl. 260—384)

This invention relates to a process for preparing 1-bromo-2-methylanthraquinone, which is a valuable intermediate for the preparation of dyes of the various classes.

While 1-bromo-2-methylanthraquinone has been mentioned in the literature, no procedure for preparing it has been given and it has never come into commercial use in the manufacture of dyestuffs because of the difficulty encountered in preparing it by the usual bromination methods in sufficient yields and of satisfactory purity to make it commercially useful as a dyestuff intermediate.

It has been found that, in the monobromination of 2-methylanthraquinone by the usual bromination methods, the bromine enters more than one position in the molecule, and, while the 1-bromo-2-methylanthraquinone is of value as a dyestuff intermediate particularly in the preparation of pyranthrone, the isomeric impurities which are found to be present are not useful in the preparation of pyranthrone or other dyes that may be produced from 1-bromo-2-methylanthraquinones, and since these isomers are difficult to remove from the desired product, they render it unsatisfactory for commercial use. The usefulness of 1-bromo-2-methylanthraquinone as a possible intermediate in the preparation of dyestuffs such as pyranthrone depends upon the possibility of carrying out the bromination of 2-methylanthraquinone by a process which suppresses the formation of the isomers and which will give chiefly 1 - bromo - 2 - methylanthraquinone, and upon whether the particular isomers produced can be separated from the desired product or whether the presence of those particular isomers is detrimental to the subsequent use of the desired 1-bromo-2-methylanthraquinone.

While in all cases an absolutely pure intermediate is not required in the preparation of various dyes, the factors which determine whether a product can be used successfully in the commercial preparation of a dye will depend upon the ultimate yields of dye which can be obtained from the starting materials, and also upon the purity of the dye that can be obtained either directly or by reasonably economical purification methods.

It is an object of the present invention to provide a process for producing 1-bromo-2-methylanthraquinone by direct bromination of methylanthraquinone, which will give the 1-bromo-2-methylanthraquinone of sufficient purity that it can be satisfactorily employed in the preparation of vat dyes such as pyranthrone.

We have found that 2-methylanthraquinone can be brominated principally in the 1-position by carrying out the bromination in a mixture of oleum and chlorosulfonic acid and in the presence of an oxidizing agent such as chlorine or sulfuryl chloride. The bromination is preferably carried out in the presence of iodine, iodine chlorides and iodine bromides, or by the use of sulfur as a catalyst.

The oleum and chlorosulfonic acid mixture should be employed in a volume sufficient to give a readily stirrable mass, and preferably the total acid mixture should be at least 2 parts per part of methylanthraquinone. To obtain proper bromination of the 2-methylanthraquinone, the oleum-chlorosulfonic acid mixture should contain from 15% to 35% of $SO_3$ (i. e., $SO_3$ which is not bound by water and which is normally considered to be free $SO_3$ in an oleum mixture). The chlorosulfonic acid should comprise from 45% to 78% of the mixed acids. The $SO_3$ may be added to the acid mixture by the use of oleum of any desired per cent that will give the necessary free $SO_3$ concentration required. $SO_3$ itself may of course be added, although the use of oleum of 63% is a satisfactory method for obtaining the necessary concentration of the $SO_3$. With less than 15% of $SO_3$ in the acid solution, bromination of the 2-methylanthraquinone is difficult to carry to completion, while, with an amount of $SO_3$ in excess of 35%, the amount of the 3-bromo-2-methylanthraquinone formed increases as the concentration of the $SO_3$ above 35% is increased in the solution.

The amount of sulfuryl chloride employed in the acid mixture is preferably between 0.5 mol and 2 mols per mol of methylanthraquinone. The reaction is preferably carried out in the presence of from 0.3 to 1.2 parts of sulfuryl chloride per part of methylanthraquinone.

To obtain the proper degree of bromination under the conditions above set forth, the bromine should be employed in an amount equal to from 1 to 1.1 atoms of bromine per mol of methylanthraquinone. Any material increase in the amount of bromine over that specified above, while employing the conditions specifically set forth with regard to acid concentrations, is found to be undesirable since it causes increased contamination of the product with dibromomethylanthraquinone derivatives.

Where chlorine is employed in place of the sulfuryl chloride in oxidizing the hydrobromic acid, it should be used in an amount equal to from 1 to 1.1 atoms of chlorine per mol of methylanthraquinone. If larger amounts of chlorine are used, the tendency to form dihalogen derivatives is increased.

The bromination is preferably carried out at temperatures not in excess of 40° C. Where chlorine is employed as the oxidizing agent, the bromination is preferably carried out at from 0 to 5° C.

The following examples are given to illustrate the invention. The parts used are by weight, unless otherwise specified.

Example 1

One part of finely divided 2-methylanthraquinone was gradually added below 20° C. to an agitated mixture of 1.136 parts of 64% oleum with 2.1 parts of chlorosulfonic acid and 0.01 part of iodine. The mass was cooled to 0° to 5° C. and agitated for 1.5 hours at this temperature. Then 1.216 parts of sulfuryl chloride and 0.361 part of bromine were permitted to run into the mixture and the temperature allowed to rise to 25° C. The reaction mass was further agitated at 25° to 30° C. for 40 hours, was then drowned in 20 parts of ice water, filtered, and washed free from acid. The cake was thereafter slurried in 10 parts of 2% aqueous caustic soda and the slurry heated to 95° C. for 5 minutes. The suspension was again filtered, washed free from alkali and dried. There were obtained 1.34 parts of crude product consisting primarily of 1-bromo-2-methylanthraquinone, and containing 25.16% of Br and 0.68% of Cl.

In the above example, other mixtures of oleum and chlorosulfonic acid may of course be employed, as more particularly specified in the general description above, provided the concentration of the $SO_3$ in the acid mixture is kept between 15% and 35% and the concentration of the chlorosulfonic acid is maintained between 45% and 76% of the total acid concentration. The amount of sulfuryl chloride employed may be reduced to as low as 0.3 part.

Example 2

One part of finely divided 2-methylanthraquinone was introduced with stirring into a mixture of 1.045 parts of chlorosulfonic acid, 1.136 parts of 63.4% oleum and 0.013 part of iodine below 20° C. The mass was cooled to 0° to 5° C. and 0.361 part of bromine was then introduced. With speedy agitation 0.1597 part of chlorine was thereafter led into the reaction mass. The chlorine entered the reaction mass through a porous wall, which assured very fine distribution of the chlorine gas. This chlorine introduction took 4 hours at 0° to 5° C.

During this bromination in the presence of chlorine, no gas escaped from the reaction vessel and no pressure developed in the container. After the addition of the chlorine, the whole was further agitated at 0° to 5° C. for another 10 hours, was drowned in ice water and worked up as described in detail in Example 1. There were obtained 1.355 parts of 1-bromo-2-methylanthraquinone of good quality.

In this run, the amounts of 63.4% oleum and chlorosulfonic acid may be varied. Thus, 0.563 part of 63.4% oleum may be employed, instead of the above 1.126 parts.

Example 3

14.6 parts of bromo-2-methylanthraquinone (obtainable as in Example 1), 14.6 parts of naphthalene and 4.4 parts of copper powder, were heated together with stirring to 215° C. and maintained for 12 hours. The reaction mass was then cooled to 90° C., and 10 parts of alcohol were added slowly. The mass was filtered and the cake washed with alcohol and water, in turn. The cake was suspended in 25 parts of water and 25 parts of 36% hydrochloric acid. After heating to 65°–80° C., the copper was solubilized by adding slowly 3.4 parts of sodium chlorate. After addition of the chlorate, the mass was maintained for one-half hour at 80° C., then filtered. The cake was washed acid-free and dried. There were obtained 8.2 parts of 2,2'-dimethyl-1,1'-dianthraquinonyl suitable for conversion to the orange dyestuff, pyranthrone, by the procedure of U. S. application Serial No. 536,986.

While the 1-bromo-2-methylanthraquinone, obtained as illustrated above, is by no means a pure compound, it is of such a purity that it can be satisfactorily condensed to the 2,2'-dimethyl-1,1'-dianthraquinonyl as illustrated in Example 3, for conversion to pyranthrone. The 1-bromo-2-methylanthraquinone obtained by this process is also useful as an intermediate for the preparation of other vat dyes, acetate silk dyes and wool dyes, as well as for the preparation of pigment colors. The bromo-methylanthraquinone obtained by this process is more readily converted to pyranthrone than the corresponding chloromethylanthraquinone previously used for this purpose, and much higher overall yields of the pyranthrone can be obtained therefrom.

We claim:

A process for preparing 1-bromo-2-methylanthraquinone which comprises reacting 2-methylanthraquinone in a mixture of oleum and chlorosulfonic acid with from 1 to 1.1 atoms of bromine per mol of methylanthraquinone, the reaction being carried out in the presence of a bromination catalyst and an oxidizing agent of the group consisting of chlorine and sulfuryl chloride, the oleum-chlorosulfonic acid reaction mixture containing from 45% to 78% of chlorosulfonic acid and from 15% to 35% of free $SO_3$, the amount of oxidizing agent employed being only sufficient to liberate the bromine from the hydrobromic acid formed during the reaction.

JOSEPH DEINET.
HANS B. GOTTLIEB.